Figure 1:
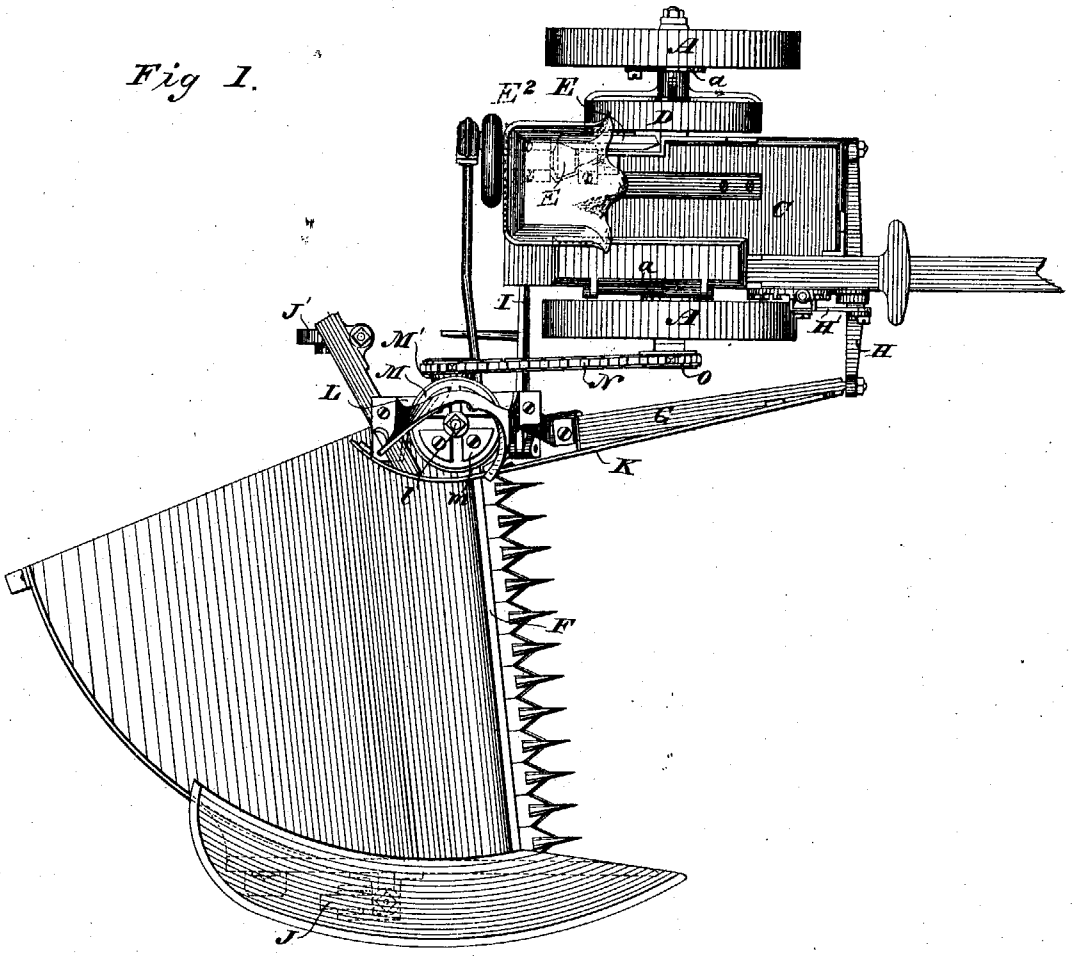

5 Sheets—Sheet 1.

J. S. MARSH,

Assignor to H. A. MARSH.

HARVESTER RAKE.

No. 10,094. Reissued Apr. 25, 1882.

WITNESSES

Wm. A. Skinkle

Geo. W. Breck

INVENTOR

James S. Marsh.

By his Attorneys

Baldwin Hopkins & Peyton

N. PETERS, Photo-Lithographer, Washington, D. C.

5 Sheets—Sheet 2.

J. S. MARSH,

Assignor to H. A. MARSH.

HARVESTER RAKE.

No. 10,094. Reissued Apr. 25, 1882.

WITNESSES

Wm A Skinkle

Geo. W. Breck

INVENTOR

James S. Marsh.

By his Attorneys

Baldwin Hopkins & Peyton

N. PETERS, Photo-Lithographer, Washington, D. C.

5 Sheets—Sheet 3.

J. S. MARSH,

Assignor to H. A. MARSH.

HARVESTER RAKE.

No. 10,094. Reissued Apr. 25, 1882.

WITNESSES

Wm A Skinkle

Geo. W. Breck

INVENTOR

James. S. Marsh.

By his Attorneys

Baldwin, Hopkins & Peyton

N. PETERS. Photo-Lithographer. Washington, D. C.

J. S. MARSH,
Assignor to H. A. MARSH.
HARVESTER RAKE.
No. 10,094. Reissued Apr. 25, 1882.
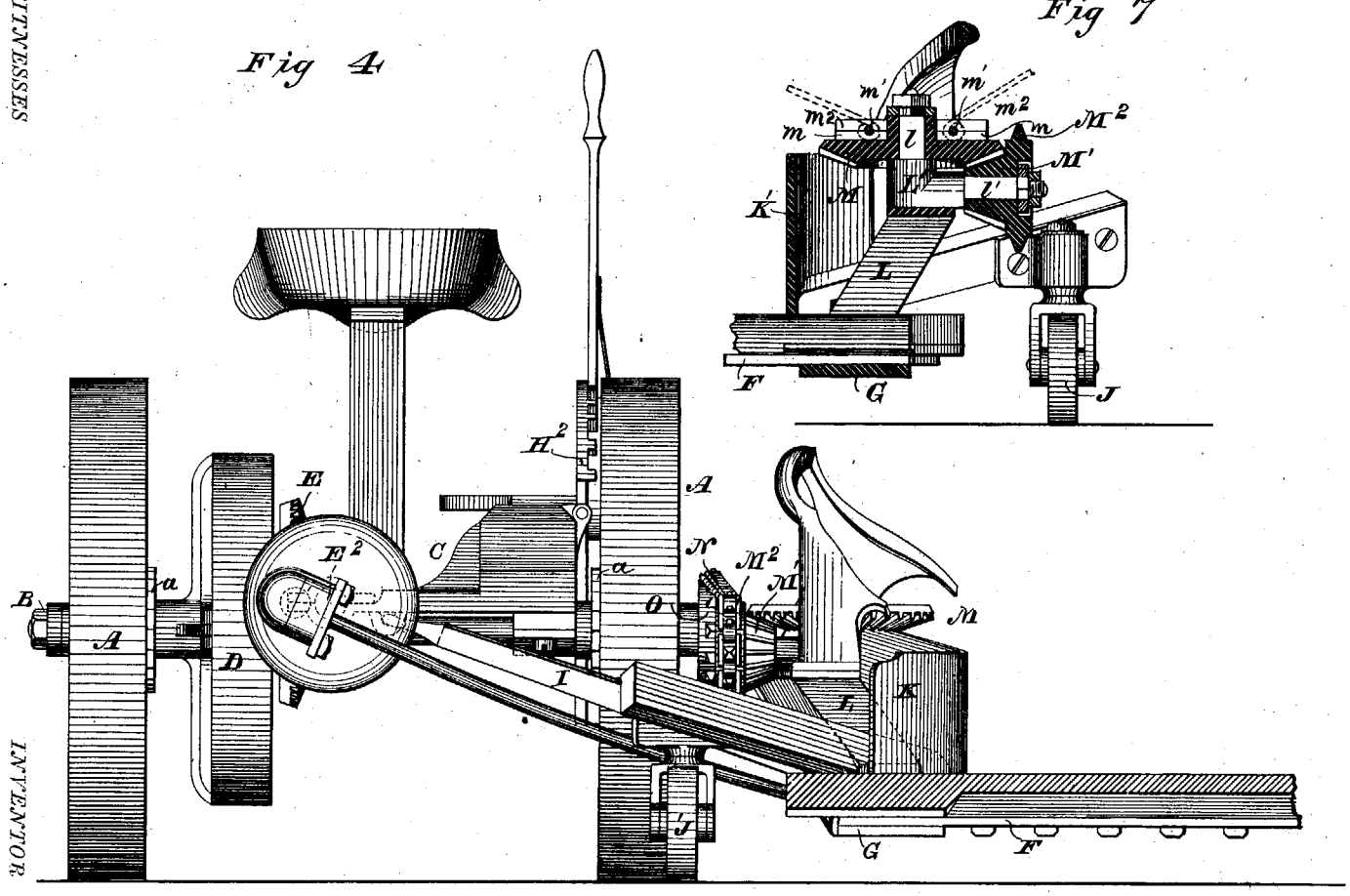
WITNESSES
Wm. A. Skinkle.
George W. Breck.
INVENTOR
James S. Marsh.
By his Attorneys
Baldwin, Hopkins & Peyton
N. PETERS. Photo-Lithographer, Washington, D. C.

J. S. MARSH,

Assignor to H. A. MARSH.

HARVESTER RAKE.

5 Sheets—Sheet 5.

No. 10,094.

Reissued Apr. 25, 1882.

WITNESSES

Wm. A. Skinkle

Geo. W. Breck

INVENTOR

James. S. Marsh.

By his Attorneys.

Baldwin, Hopkins, & Peyton.

N. PETERS. Photo-Lithographer, Washington, D. C.

UNITED STATES PATENT OFFICE.

JAMES S. MARSH, OF LEWISBURG, PENNSYLVANIA, ASSIGNOR TO HARRY A. MARSH, OF SAME PLACE.

HARVESTER-RAKE.

SPECIFICATION forming part of Reissued Letters Patent No. 10,094, dated April 25, 1882.

Original No. 164,926, dated June 29, 1875. Application for reissue filed May 21, 1877.

DIVISION A.

*To all whom it may concern:*

Be it known that I, JAMES S. MARSH, of Lewisburg, in the county of Union and State of Pennsylvania, have invented certain new useful Improvements in Harvesting-Machines, of which the following is a full, clear, and exact description.

My invention relates to a convertible or combined harvesting-machine—that is, one which can be used either as a reaper or as a mower—of the class known as "two-wheeled hinge-joint rear-cut harvesters."

The first part of my invention relates to means for driving an automatic rake. Its object is to allow the platform and rake-supporting standard freely to rise and fall to conform to undulations of the ground without affecting the movements of the main frame and without binding or straining the gearing; to which end my improvements consist in the combination of two main supporting and driving wheels, a main frame supported thereby, a short laterally-projecting finger-beam connected therewith by a hinged drag-bar and coupling-arm, rake-supporting mechanism mounted upon the inner front corner of the grain-platform, a sprocket-wheel on the main axle outside of the driving-wheel, a corresponding sprocket-wheel mounted upon the inner front corner of the grain-platform, a driving chain connecting the two sprocket-wheels, and rake-carrying mechanism driven thereby.

The object of the next part of my invention is to protect the rake-driving mechanism from entanglement with the incoming grain, which end I attain by inclosing the gearing within a fender secured upon the platform and upon the rocking drag-bar, whereby the fender accommodates itself to the movements of the drag-bar and platform.

The object of the next part of my invention is to enable the driver from his seat upon the machine, and without stopping the machine, to tip the rake and platform without disturbing the relation of the working parts; to which end my improvement consists in combining, in a two-wheeled hinged-bar rear-cut harvester, rake-driving mechanism mounted upon the inner front corner of the platform, and driven by a chain from the end of the main axle, with a lever mounted upon the main frame and connected with the front end of the drag-bar.

Figure 2:
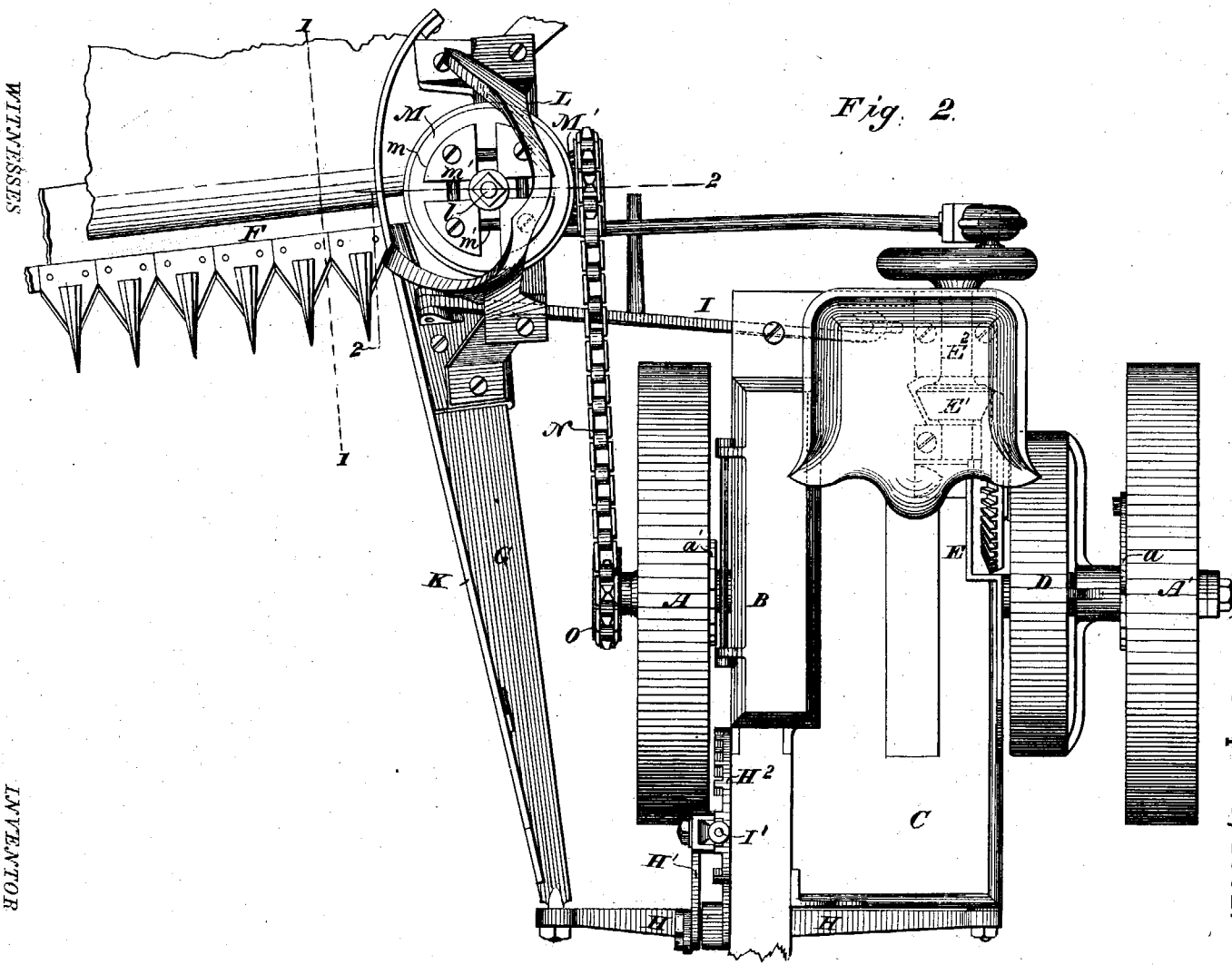
Figure 3:
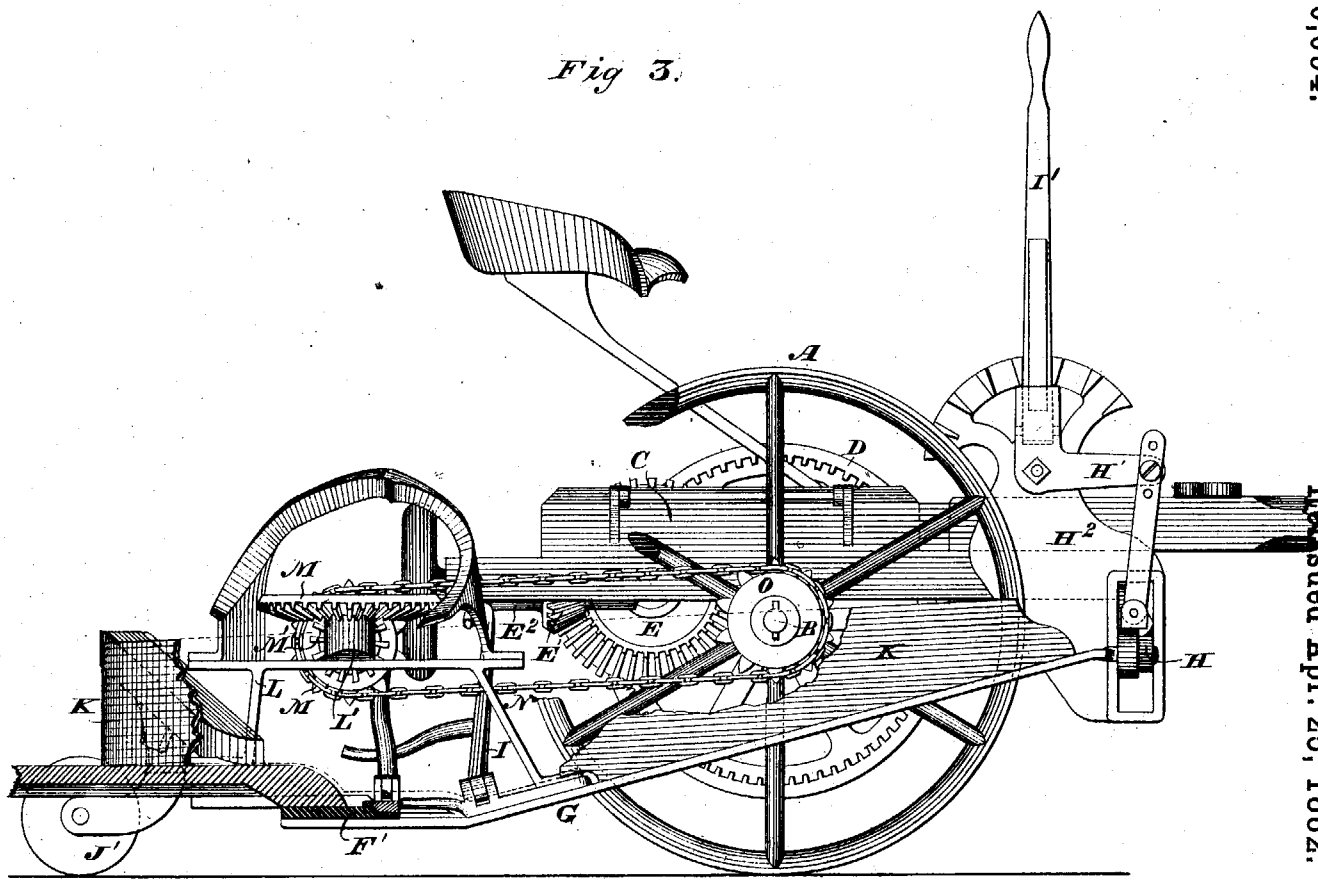
Figure 6:
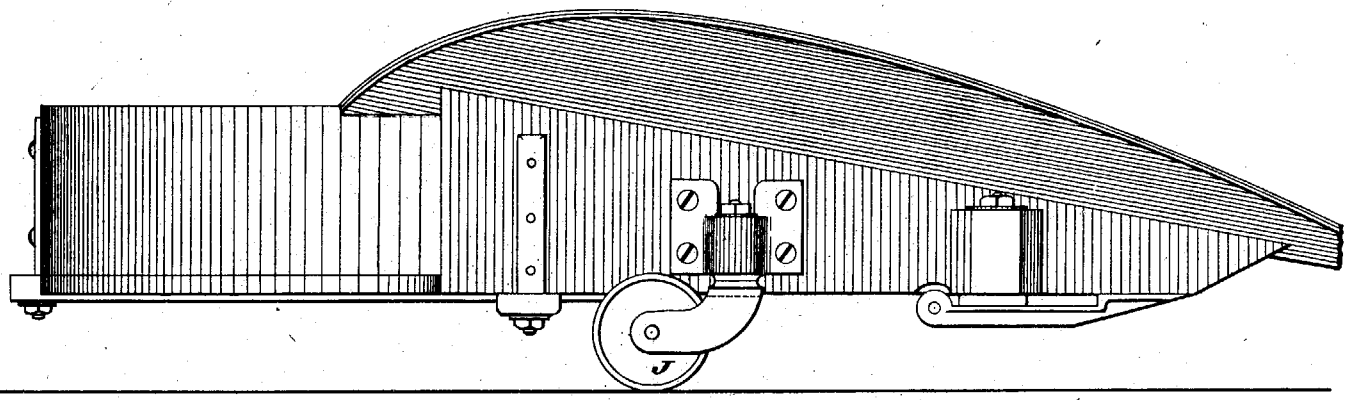
Figure 5:
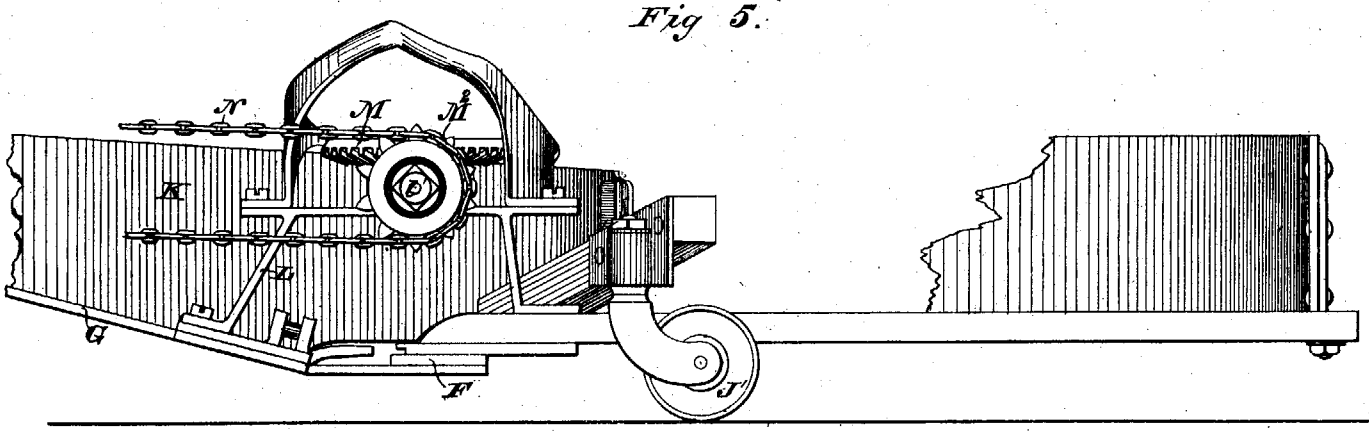

In the accompanying drawings, which show all the improvements above referred to as embodied in one machine, Figure 1 is a plan view; Fig. 2, a similar view, on an enlarged scale, of the main frame and the parts which connect the grain-platform to it. Fig. 3 is a side view of that portion of the machine represented in Fig. 2; Fig. 4, a rear elevation of the same; Fig. 5, a side view of the grain-platform, looking at the side next to the main frame; Fig. 6, a similar view, looking from the grain side; and Fig. 7, a vertical cross-section through the rake-standard on the line 2 2 of Fig. 2.

In the accompanying drawings, two main supporting and driving wheels, A A′, are shown as mounted loosely upon an axle, B, turning in boxes or bearings on the main frame. These wheels are connected with the axle by the usual backing-ratchets, *a*.

The main frame C rests upon the axle and extends both in front and rear of the driving-wheels, in order to facilitate the connection of the cutting apparatus. An internally-geared spur-wheel, D, fast on the main axle, drives a spur-pinion and bevel-wheel, E, on a short shaft, which bevel-wheel meshes with a like pinion, E′, on a crank-shaft, $E^2$, which drives the cutters by a crank and pitman in the usual way. The inner end of the finger-beam F is rigidly secured to a drag-bar, G, extending upward and forward, and pivoted at its front end to a transverse arm or link-rod, H, which is in turn pivoted at its outer end to the outer front corner of the main frame. The finger-beam is likewise connected with the main frame by means of a lateral brace or coupling-arm, I, pivoted at one end to the drag-bar G, near the rear end thereof, and at the other end to the main frame, near its outer rear corner.

The front arm or link-rod, H, is connected to a crank or elbow lever, H′, pivoted to a plate, $H^2$, bolted to the inner side of the main frame, at or near its front corner. This plate is constructed in the form of a sector, and the pivot of the lever is concentric therewith, so that its arm can be made to catch between teeth projecting from said sector, and thus sustain the forward end of the drag-bar in any position desired. The upper arm of the lever has also a slight lateral motion on its pivot to permit it to move past the teeth, between which it is held by a slight spring, and can be readily manipulated by an attendant while occupying his seat on the main frame.

The lateral brace or coupling-arm and drag-bar allow the finger-beam to vibrate freely about their outer joints, so that either end of the finger-beam may rise or fall without correspondingly affecting the other end, and the finger-beam may also be rocked or rolled in the line of its length.

The organization above described is that which adapts the machine for use as a mower, and constitutes the subject-matter claimed in Reissued Patent No. 7,870, granted September 4, 1877.

When the machine is used as a reaper the lever I′ enables the driver to raise and lower the cutting apparatus, together with the front part of the platform, which is secured to the finger-beam in usual well-known ways, and supported upon two caster-wheels. The outer one or grain-wheel, J, is pivoted to a vertical guard-board of the divider, and the inner one, J′, or that next the main frame, is applied to a short beam secured to the platform near its inner front corner. Being thus supported, the platform can be raised or lowered by means of the rocking lever—that is to say, both the inner and outer ends of the finger-beam and the platform which is secured to it will be elevated or depressed alike, neither end being allowed to sag. The axes of the caster-wheels become the fulcra about which the platform is adjusted while cutting grain.

A guard or fender, K, extends backward from a point near the front end of the drag-bar over this bar, and curves around the arched standards, so as to gather the standing grain and press it up to the cutters, and also to inclose the gearing and to prevent the grain from becoming entangled with the driving-chain, gearing, or rake-joints. This rear curved portion of the guard or fender extends over and is suitably attached to the platform, while its straight portion extends over and is suitably secured to the drag-bar. (See Figs. 1 and 2.) This fender may extend well up at the point where it protects the gearing of the rake, but should not be so high as to interfere with the horizontal sweep of the rake and reel-arms.

The fender, it will be observed, conforms freely to all the movements both of the platform and drag-bar.

A rake-supporting standard, L, made somewhat in the form of an arch or bridge, with two legs united at their upper ends, has one leg secured rigidly to the platform and the other to the drag-bar, so as to form a stiffening-brace at the point of connection between the drag-bar, finger-beam, and platform. This casting I term a "straddling-standard," as it strides or straddles the finger-beam, so as to allow the cutting apparatus and pitman to play freely beneath it.

A block, L′, secured upon the standard, is provided with a central vertical pin, *l*, around which a crown-wheel, M, provided with bevel-teeth, rotates freely. This wheel is driven by a corresponding bevel-pinion, M′, turning freely around a fixed shaft, *l*′, projecting from the block above mentioned. A sprocket-wheel, $M^2$, secured to or formed with this pinion, is encircled by a driving-chain band, N, passing over a sprocket-wheel, O, keyed on the inner end of the main driving-axle; or a sprocket-wheel may be attached directly to the inner driving-wheel. The crown-wheel M thus receives continuous rotary motion when the machine is moving forward.

Sector-shaped lugs *m*, cast on the top of the crown-wheel, have radial spaces between them for the reception of the hinged or inner ends of the rake and gathering arms. Each sector has two depressions formed in it to receive pins or cross-heads *m*′, forming the pivots for the rake and reel arms, which pins are held down in their places by means of sector-caps $m^2$, bolted upon the sectors. The arms are thus firmly secured against lateral strains, while free to rise and fall vertically. This feature is claimed in the other division of this reissue. A rake-head and reel-beaters are secured to these arms, but are not shown, as they form no part of the subject-matter herein claimed, and other raking attachments may be used in conjunction with the devices hereinbefore described.

It will be seen that the rake-arms are pivoted to the crown-wheel, which is supported upon the inner front corner of the platform, and so arranged and operated that they sweep around over the platform, then rise to a vertical position, and descend again in front of the cutting apparatus, so as to sweep the grain, when cut, around and deliver it upon the ground upon the inner side of the platform.

The details of one form of the raking apparatus are fully shown and described in another division of this reissue.

It will be seen from the above description that I employ sprocket-wheels and a chain for communicating motion from the axle of the transporting-wheels to the revolving crown-wheel, which chain may be run slack, so as to allow of the undulations or rising and falling movements of the finger-beam and raking attachments, and still keep up a continuous motion of the rake and reel or beater arms around their axes.

When it is desired to run the rake and beater arms faster or slower with respect to the forward movement of the machine, the sprocket-wheels can be removed from their shafts and larger or smaller ones substituted, or those in use shifted so as to bring the small one on the shaft occupied by the large one, and vice versa.

The operation and advantages of my improvements will be obvious to those skilled in the art without further description.

I do not broadly claim a fender inclosing gearing or a fender mounted on a drag-bar, as these are both old *per se;* but I am not aware that the fender, drag-bar, and gearing have ever been combined for joint operation as shown by me prior to my invention.

Having thus described my invention, what I claim as new, and desire to secure by Letters Patent, is—

1. The combination, substantially as hereinbefore set forth, in a two-wheel hinge-bar rear-cut harvester, of a sprocket-wheel on the inner end of the main axle, a sprocket-pulley supported by the rake-stand on the platform, and a driving-chain connecting the two to drive the raking mechanism.

2. The combination, substantially as hereinbefore set forth, of two main supporting and driving wheels, a main frame supported thereby, a short laterally-projecting finger-beam connected therewith by a hinged drag-bar and coupling-arm, rake-supporting mechanism mounted upon the inner front corner of the grain-platform, a sprocket-wheel on the main axle outside of the driving-wheel, a corresponding sprocket-wheel mounted upon the inner front corner of the platform, a driving-chain connecting the two sprocket-wheels, and rake-carrying mechanism driven thereby.

3. The combination, substantially as hereinbefore set forth, of two main supporting-wheels, the main frame supported thereby, the short laterally-projecting finger-beam, connected therewith by a hinged drag-bar and coupling-arm, a low rake-supporting standard mounted upon the inner front corner of the platform, the sprocket-wheel on the main axle outside of the driving-wheel, rake-carrying mechanism mounted upon the rake-supporting standard, and a driving-chain actuating the rake-carrying mechanism.

4. The combination, in a two-wheeled hinged-bar harvester, of the rake-driving mechanism mounted upon a low rake-supporting standard at the inner front corner of the platform, the drag-bar, vertically adjustable at its forward end, and the fender mounted upon the drag-bar and constructed as described with its rear portion extending over the platform and surrounding the rake-gearing and its straight front portion extending over the drag-bar, these members being constructed and operating in combination, substantially as hereinbefore set forth, whereby the fender, while protecting the rake-gearing, conforms to the movements of the rake, finger-beam, platform, and drag-bar.

5. The combination, substantially as hereinbefore set forth, in a two-wheeled hinge-bar rear-cut harvester, of rake-driving mechanism mounted upon the inner front corner of the platform and driven from the outer end of the main axle by a chain and sprocket-wheels, with a drag-bar rocked at its forward end by a lever, whereby the cutting apparatus and rake may be tilted in unison.

JAMES S. MARSH.

Witnesses:
WM. D. BALDWIN,
WM. J. PEYTON.